United States Patent Office 3,412,298
Patented Nov. 19, 1968

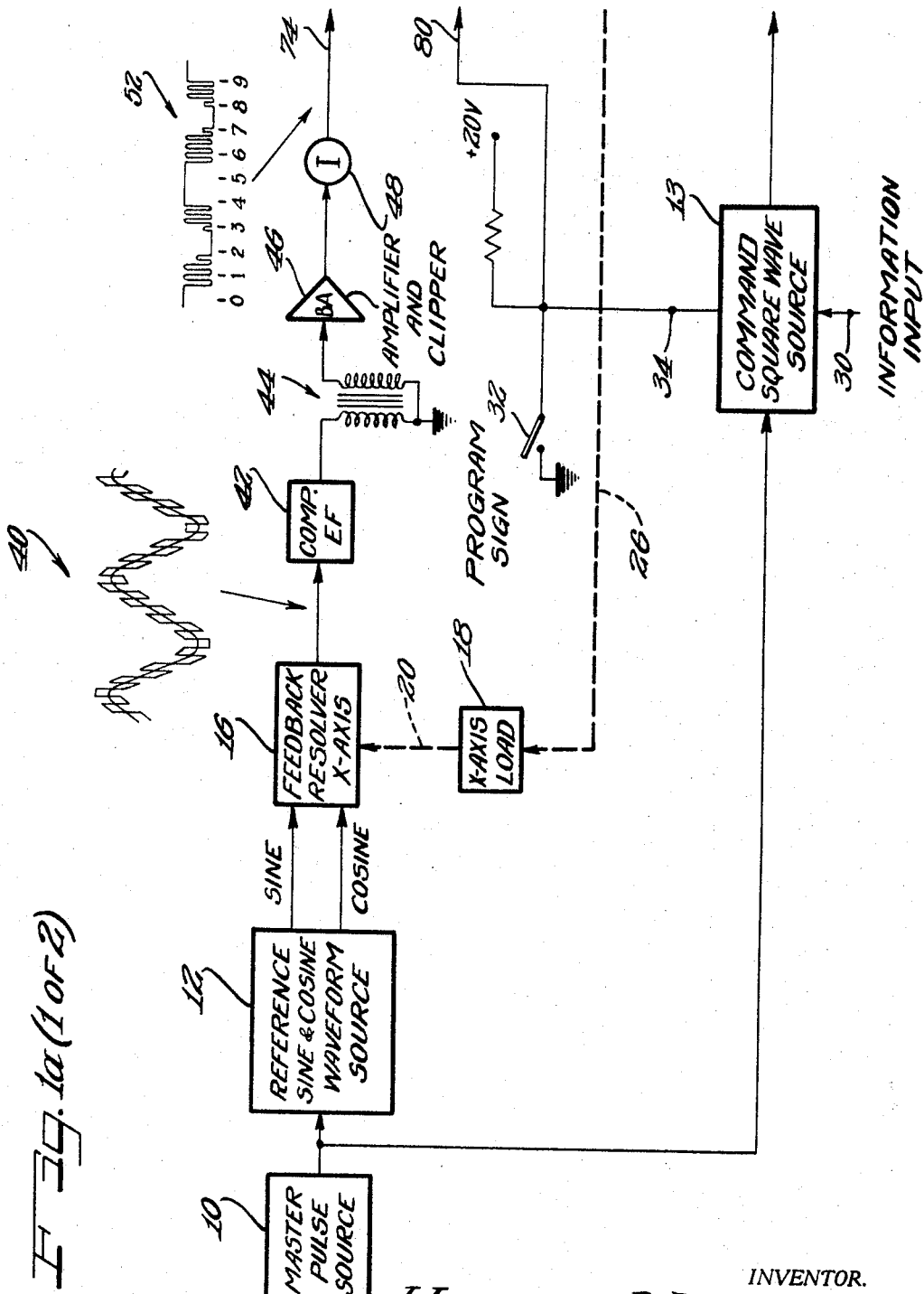

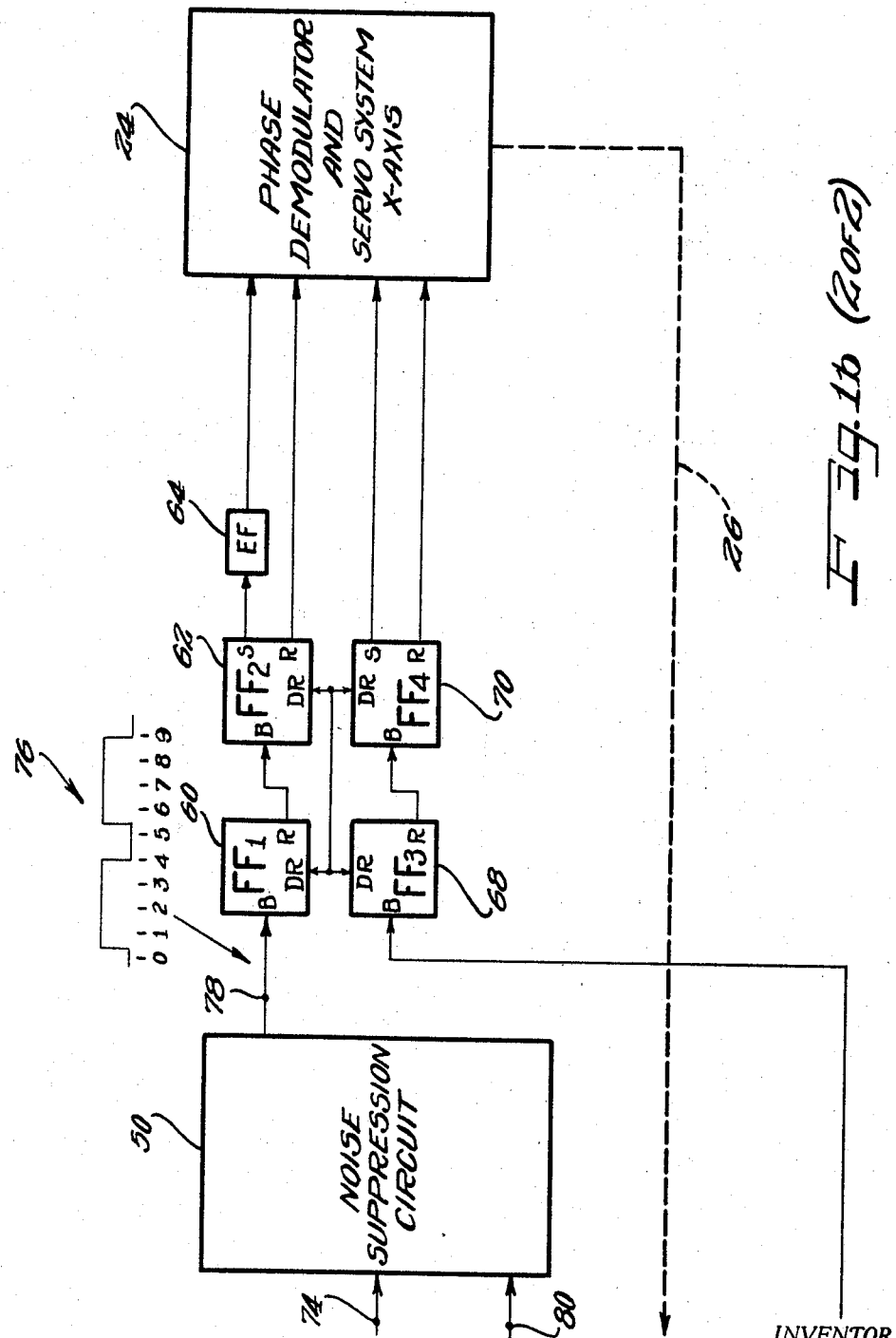

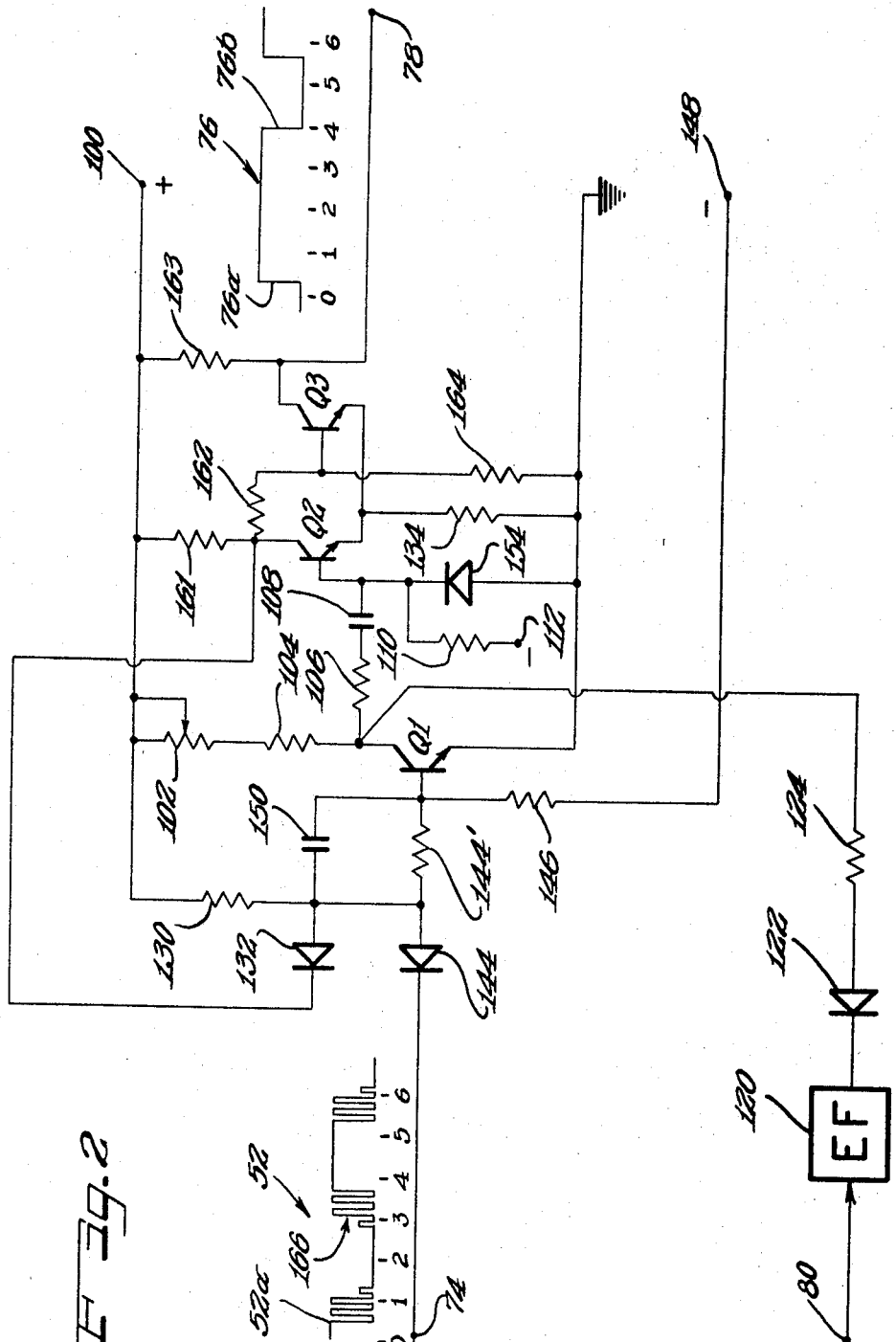

3,412,298
DIRECT COUPLED MULTIVIBRATOR (DCMV) CIRCUIT FOR REJECTING NOISE IN A FEEDBACK SERVOMECHANISM
Harvey J. Rosener, Dayton, Ohio, assignor, by mesne assignments, to The Bunker-Ramo Corporation, Stamford, Conn., a corporation of Delaware
Filed Nov. 27, 1964, Ser. No. 414,093
11 Claims. (Cl. 318—18)

ABSTRACT OF THE DISCLOSURE

A feedback control system comprising a resolver supplying a sine wave feedback signal subject to noise, an amplifier and clipper to convert to a square wave feedback signal, and a noise suppression circuit having a duty cycle to reject noise, the length of the duty cycle being automatically adjusted in response to positive and negative command input signals.

This invention relates to a feedback control system and method and particularly to a numerical contouring system having means for nullifying the adverse effects of noise pulses in the feedback loop.

It is an important object of the present invention to provide a feedback control system and method capable of tolerating a substantial noise level in the feedback loop from the feedback resolver or other position measuring transducer.

In a numerical contouring system using a feedback loop and in other feedback systems the instantaneous frequency from the position measuring transducer will vary depending on the direction of movement of the output element of the system.

It is therefore a further object of the present invention to provide a numerical contouring system and method wherein the characteristics of a noise suppression circuit are automatically adjustable in accordance with the polarity of command input signals to the system.

The present invention has particular application to a numerical contouring system wherein the output of a feedback resolver or the like is to be delivered to a frequency divider, for example to permit an extended following error of the servo system. Any noise pulses in the resolver output could produce spurious triggering of the frequency divider and consequent loss of synchronism of the system.

Consequently another object of the invention resides in the provision of an extended following error type numerical contouring system wherein noise pulses from the position measuring transducer in the feedback loop are prevented from causing a loss of synchronism in the system.

A feature of the invention resides in the provision of multivibrator means for rejecting noise pulses which will accept a trigger from a slow change source up to a high frequency source. Further, the monostable means should offer a minimum of phase shift, dependent on the input rise time. Preferably the monostable means provides a normal pulse with a constant rise time regardless of the rise time of the source. Also, the circuitry should maintain its time constant relatively constant over a substantial temperature range.

Other objects, features and advantages of the present invention will be apparent from the following detailed description taken in connection with the accompanying drawings, in which:

FIGURES 1a and 1b (collectively termed FIG. 1) show a block diagram of an overall system in accordance with the present invention, FIG. 1b being a continuation of FIG. 1a to the right; and FIGURE 2 is a detailed electric circuit diagram of a preferred multivibrator type noise suppression circuit in accordance with the present invention.

The present invention is particularly applicable to a numerical contouring system such as disclosed in the McGarrell U.S. Patent No. 3,079,522, issued Feb. 26, 1963.

In such a system, there is provided a master pulse source such as indicated at 10 supplying pulses at a relatively high frequency such as 100 kilocycles per second. In the embodiment illustrated herein, the master pulses are supplied to a reference sine and cosine waveform source 12 and to a command square wave source 13. The sine and cosine outputs of the component 12 may have a frequency of 200 cycles per second and may be supplied to a feedback resolver component 16 for the axis of a machine tool or the like to be controlled. As illustrated in said McGarrell patent, a sine waveform may be generated by means of a frequency divider chain and suitable wave shaping means. An X-axis load component is indicated at 18 which is mechanically coupled with the feedback resolver 16 as indicated in the dash line 20. The load component 18 is illustrated as being mechanically coupled to a phase demodulated and servo system for the X-axis designated by the reference numeral 24. The mechanical coupling of the servo system to the load 18 is indicated by the dash line 26.

The command square wave source 13 may be of the type illustrated in said McGarrell patent and may receive a series of input command pulses from terminal 30 which serve to modulate the master pulses supplied to the source 13 from the master pulse source 10. The sign of the command input pulses may, of course, be programmed on a punched paper tape or the like along with the incremental distance through which the load 18 is to be moved as described in said McGarrell patent. In the illustrated embodiment, switch means is indicated at 32 which will assume an open condition to provide a high input to terminal 34 of the command square wave source 13 in the event that a positive command is programmed on the tape or is manually selected, while the switch means 32 will be closed to supply a ground potential to terminal 34 in the event that a minus input command is to be required of the source 13. In said McGarrell patent, a plus command pulse is added to the 100 kilocycle per second pulse train as an additional pulse, the modulated pulse train being supplied to a frequency divider chain which divides by the same factor such as 500 as in the reference waveform source 12. If the command is to be minus, an input command pulse causes the deletion of a pulse from the 100 kilocycle per second master pulse source. The output of the command square wave source 13 is, therefore, a 200 cycle per second square wave which is modulated in accordance with the information supplied at terminals 30 and 34. Specifically, the phase of the command square wave may be advanced in response to plus input command pulses, and may be retarded in response to minus input command pulses in comparison with the phase of the reference waveforms supplied by reference waveform source 12.

The output of the feedback resolver 16 is, of course, a function of the instantaneous position of the load 18. The alternating feedback waveform from resolver 16 is subject to appreciable noise so that the actual waveform may be somewhat as diagrammatically indicated at 40 in FIGURE 1. The feedback waveform 40 is buffered in a complementary emitter follower component 42 and stepped up approximately 2:1 by the transformer 44.

The sine wave is then amplified and clipped or squared (in the sense that the peaks of the sine wave are squared off by means of a bias amplifier component 46). The squarewave feedback signal in the component 46 is 180° out of phase with the feedback resolver output sine wave, so that the squarewave feedback signal is inverted by component 48. A noise suppression circuit 50 in accordance with the present invention thus receives a feedback squarewave signal indicated diagrammatically at 52 in FIGURE 1, which waveform comprises the desired square wave feedback waveform with superimposed noise pulses. The actual feedback waveform may include noise pulses in advance of and beyond the correct zero crossing points of the feedback waveform.

As illustrated in FIGURE 1b, the feedback waveform 52 is to be coupled to the binary input of a flip-flop component 60 which is to further divide the frequency of the feedback square wave, for example, for the purpose of accommodating an extended following error in the servo system. In the illustrated embodiment, the feedback square wave signal is to be divided by four, and for this purpose, the reset output of flip-flop 60 is connected to the binary input of a second flip-flop 62. The set output of flip-flop 62 is supplied via an emitter follower component 64 to one input of phase demodulator and servo system component 24, while the reset output of flip-flop 62 is connected to a second input of the phase demodulator section component 24. It will be appreciated that the phase demodulator of the McGarrell Patent 3,079,522 may be utilized in component 24, although the feedback square wave signal may have a carrier frequency of 50 cycles per second rather than 200 cycles per second. The command square wave signal from component 13 is divided in frequency by flip-flops 68 and 70 so as to provide a command square wave from the set and reset terminals thereof also having a carrier frequency of 50 cycles per second.

Referring to FIGURE 2, the noise suppression circuit 50 preferably comprises a multivibrator type circuit which once triggered by a negative going portion of the feedback waveform 52 remains in an actuated condition for a predetermined duty cycle during which the input to the circuit designated by the reference numeral 74 may receive further negative or positive going pulses without affecting the output waveform which may generally be as indicated by the reference numeral 76 at the output terminal 78.

Preferably the duty cycle of the circuit 50 is adjustable in accordance with the input at control terminal 80 of the circuit. In a preferred embodiment, with control terminal 80 in a high potential condition, the duty cycle is 70% of the fundamental feedback carrier wavelength. On the other hand, if control terminal 80 is lowered to ground potential, the time constant of the circuit 50 is preferably increased to about 80% of the period of the fundamental feedback carrier wave. As illustrated, the control terminal 80 may be coupled with the program sign switch means 32 so that for plus command modulation, control terminal 80 will receive a relatively high positive potential, while for minus command signals, the potential of terminal 80 will be relatively low.

The detailed operation of the circuit of FIGURE 2 will now be described by way of illustration of a preferred embodiment of duty cycle type noise suppression circuit for the system of FIGURE 1.

Referring to the input waveform at terminal 74 designated generally by the reference numeral 52, if a point on the waveform is designated as occurring at time zero, at this time transistor Q1 will be in a conducting state, transistor Q2 will be in a non-conducting state and transistor Q3 will be in a conducting state to provide a low output at terminal 78 as indicated for the waveform 76 at time zero.

Subsequently, in response to the negative going pulse 52a of waveform 52 at input terminal 74, transistor Q1 will become non-conducting, and current will begin flowing in a capacitance charging circuit from positive power supply terminal 100, through adjustable resistor 102, fixed resistor 104, resistor 106, capacitor 108 and resistor 110 to a negative power supply terminal designated by the reference numeral 112.

With the control terminal 80 high, charging current will be supplied through emitter follower component 120, diode 122, resistor 124, resistor 106, capacitor 108 and resistor 110 to terminal 112. Thus, the presence of a high signal at terminal 80 tends to increase the supply of charging current and thus charge capacitor 108 more rapidly.

The charging current in the charging circuit raises the potential of the base of transistor Q2 so that transistor Q2 becomes conducting. The collector of transistor Q2 thus assumes a relatively low potential reducing the potential at the base of transistor Q3 and causing conduction to be discontinued in transistor Q3. The result is that the potential at the output terminal 78 rises rapidly as indicated at 76a on the waveform 76.

During the time that capacitor 108 is charging, the potential at the collector of transistor Q1 is relatively low. Also, with transistor Q2 conducting there is a current flow path from the positive potential terminal 100 through resistor 130, diode 132, transistor Q2 and resistor 134 to ground. This circuit tends to maintain the base of transistor Q1 in a low potential condition, so that transistor Q1 is maintained in a non-conducting state for the duty cycle of the circuit, which by way of example may be 70% with a high input at control terminal 80 corresponding to a time interval of about 3.5 milliseconds where the period of the carrier wave input is 5 milliseconds. Diode 144 serves to block positive going pulses occurring at terminal 74. Since transistor Q1 remains non-conducting during the duty cycle, negative going noise pulses, of course, will have no effect.

At a time of about 4 milliseconds in the example given, the charge on capacitor 108 will be such that transistor Q2 becomes non-conducting so that the collector terminal thereof goes high. This back biases the diode 132 so that the potential of the base of the transistor Q1 can go high, allowing the transistor Q1 to become conducting. At this time the potential of the base of transistor Q1 is determined by a circuit from the positive supply terminal 100 through resistor 130, resistor 144' and resistor 146 to a negative supply terminal 148. A capacitor 150 is shown bypassing resistor 144'.

Also, when transistor Q2 becomes non-conducting, the potential at the base of transistor Q3 rises, rendering the transistor Q3 conductive, so that the output at terminal 78 will fall rapidly to a low level as indicated for the waveform 76 at 76b.

A rapid discharge circuit for capacitor 108 is provided which extends through resistor 106, transistor Q1 and diode 154, so that capacitor 108 very rapidly returns to its initial discharged condition, the circuit 50 thus returning to its initial stable state.

Thus, at a time such as 5-milliseconds as represented on the waveforms 52 and 76, the initial conditions have been reestablished in preparation for a new cycle.

The functions of the remaining resistors 161–164 which are shown in the illustrated circuit will be apparent to those skilled in the art from the foregoing description.

It will be understood from the foregoing description that noise pulses such as indicated at 166 in the waveform 52 are substantially rejected and will have no effect on the binary counters 60 and 62 at the output of the circuit.

As previously described, when switch means 32 is closed supplying a ground potential to control terminal 80, the duty cycle is increased to about 80% of the period of the feedback waveform.

While it will be apparent that the noise suppression circuit 50 may take many different forms and may operate with different carrier frequencies, the following circuit parameters may be given by way of preferred example for the case of a 200 cycle per second carrier wave input and duty cycles of 70% and 80% depending on the sign of the command input. Positive supply terminal 100 may receive a potential of 20 volts relative to ground, while negative supply terminal 112 may receive minus 20 volts relative to ground. The following are exemplary resistance values: resistor 102, 20,000 ohms (adjustable), resistor 104, 10,000 ohms, resistor 106, 220 ohms, resistor 130, 10,000 ohms, resistor 134, 270 ohms, resistor 144' 15,000 ohms, resistor 146, 560,000 ohms, resistor 161, 5,100 ohms, resistor 162, 1,500 ohms, resistor 163 5,100 ohms, resistor 164, 680 ohms. Capacitor 108 may have a value of 1/10 microfarad. Resistor 124 may have a value of 68,000 ohms.

It will, of course, be understood that the parameters set forth above are for purposes of illustration and example, and not of limitation.

To illustrate the type of modifications which might be made under certain circumstances, it will be observed that the command square wave could be supplied to the feedback resolver component 16 (utilizing suitable sine wave shaping circuits and phase shifting circuitry), and that the reference square wave such as generated in said McGarrell patent could be supplied directly to the divider chain 68, 70 of FIGURE 1. This arrangement is not preferred at the present state of the resolver art, but is given to illustrate the type of change which may be made without departing from the concepts of the present invention. Further, it will be noted that the noise suppression circuit of FIGURE 2 could be designed to exhibit a duty cycle of 35% or 40% depending on the command sign, in which case the input to the circuit 50 would be arranged so as to be triggered both by negative going and positive going pulses. For example, this could be done by providing an inverter and oppositely poled diode shunting diode 144 at the input terminal 74.

It will further be understood that the teachings of the present invention are applicable to other types of position measuring transducer devices such as capacity type resolvers and the like.

It will be apparent that many other modifications and variations may be effected without departing from the scope of the novel concepts of the present invention.

I claim as my invention:

1. A feedback control system comprising:
    transducer means for receiving an input excitation waveform and for supplying a feedback waveform whose phase relative to said input excitation waveform is a function of the position of a load,
    converter means coupled to said feedback means for converting said feedback waveform to a generally rectangular feedback waveform, and
    multivibrator means having only one stable state connected to the output of said converter means and having a duty cycle which is a substantial fraction of the wavelength of said generally rectangular feedback waveform for substantially rejecting noise pulses in said generally rectangular feedback waveform.

2. A feedback control system comprising:
    transducer means for receiving an input excitation waveform and for supplying a feedback waveform whose phase relative to said input excitation waveform is a function of the position of a load,
    converter means coupled to said feedback means for converting said feedback waveform to a generally rectangular feedback waveform,
    multivibrator means connected to the output of said converter means and having a duty cycle which is a substantial fraction of the wavelength of said generally rectangular feedback waveform for substantially rejecting noise pulses in said generally rectangular feedback waveform, and
    means for increasing the duty cycle of said multivibrator means in response to a minus command input to said system.

3. A feedback control system comprising:
    means for generating a command rectangular waveform having a predetermined fundamental frequency and a corresponding fundamental wavelength in the absence of a command input signal and for advancing and retarding the phase of said command waveform in response to positive and negative command input signals, respectively,
    feedback position transducer means,
    means coupled with said feedback position transducer means for supplying excitation thereto comprising a reference waveform of said fundamental frequency and of said fundamental wavelength and coordinated in phase with the phase of said command rectangular waveform in the absence of command input signals,
    said feedback position transducer means supplying a feedback waveform whose phase varies with the position of a load coupled therewith but which is subject to noise pulses,
    converter means for squaring the peaks of said feedback waveform to tend to provide a generally rectangular feedback waveform, and
    duty cycle means having only one stable state coupled with said converter means for receiving said generally rectangular feedback waveform therefrom and responsive to said generally rectangular feedback waveform to generate a feedback waveform having a substantially constant amplitude over a duty cycle correlated with the wavelength of said generally rectangular feedback waveform to tend to reject noise pulses therein.

4. A feedback control system comprising:
    means for generating a command rectangular wave form having a predetermined fundamental frequency and a corresponding fundamental wavelength in the absence of a command input signal and for advancing and retarding the phase of said command waveform in response to positive and negative command input signals, respectively,
    feedback position transducer means,
    means coupled with said feedback position transducer means for supplying excitation thereto comprising a reference waveform of said fundamental frequency and of said fundamental wavelength and coordinated in phase with the phase of said command rectangular waveform in the absence of command input signals,
    said feedback position transducer means supplying a feedback waveform whose phase varies with the position of a load coupled therewith but which is subject to noise pulses,
    converter means for squaring the peaks of said feedback waveform to tend to provide a generally rectangular feedback waveform,
    duty cycle means coupled with said converter means for receiving said generally rectangular feedback waveform therefrom and responsive to said generally rectangular feedback waveform to generate a feedback waveform having a substantially constant amplitude over a duty cycle correlated with the wavelength of said generally rectangular feedback waveform to tend to reject noise pulses therein, and
    means coupled with said duty cycle means and responsive to a plus command input to establish a relatively shorter duty cycle and responsive to a minus command input to establish a relatively longer duty cycle so as to compensate the duty cycle means for changes in the frequency of the generally rectangular feedback waveform for plus and minus command inputs.

5. A control system comprising
    means for supplying a generally rectangular wave form subject to noise pulses at the half cycle transitions thereof,
    multivibrator means connected with said supplying means for receiving said generally rectangular wave form therefrom and having a duty cycle exceeding one half the wave length of said generally rectangular wave form for substantially rejecting said noise pulses therein, and bistable means having a binary input connected to the output of said multivibrator means for responding to the output from said multivibrator means, said multivibrator means insuring response of said bistable means only once in each cycle of said generally rectangular feedback wave form in spite of the presence of noise pulses therein which would otherwise serve to trigger said bistable means more than once per cycle of said generally rectangular wave form.

6. The control system of claim 5 with means for automatically selectively changing the duty cycle of said multivibrator means in response to command signals signifying relatively increased or relatively decreased wave length of said generally rectangular wave form thereby to adjust the duty cycle of said multivibrator means to maintain the same greater than fifty percent of the wave length of said generally rectangular wave form in spite of changes in the wave length thereof.

7. A control system comprising
means for supplying a generally rectangular wave form subject to noise pulses at the half cycle transitions thereof,
multivibrator means connected to the output of said supplying means and having a duty cycle which is a substantial fraction of the wave length of said generally rectangular wave form for substantially rejecting noise pulses in said generally rectangular wave form, and
means for selectively automatically changing the duty cycle of said multivibrator means so as to approximately maintain said duty cycle at said substanial fraction of the wave length of said generally rectangular wave form in spite of changes in the wave length of said generally rectangular wave form.

8. A control system comprising
means for supplying a generally rectangular waveform subject to noise pulses at regions thereof adjacent the transistions of the waveform from one amplitude level to another,
duty cycle means connected with said supplying means for receiving said generally rectangular waveform therefrom and having a duty cycle exceeding the time duration of said regions of said waveform subject to said noise pulses for substantially rejecting said noise pulses therein, and pulse responsive frequency divider means having its input connected to the output of said duty cycle means for responding to the output from said duty cycle means, said duty cycle means insuring response of said frequency divider means only to the frequency of said generally rectangular feedback waveform in spite of the presence of noise pulses therein which would otherwise serve to trigger said frequency divider means at a rate out of proportion to the frequency of said generally rectangular waveform.

9. The control system of claim 8 with means for automatically selectively changing the duty cycle of said duty cycle means in response to binary digital signals correlated with relatively increased or relatively decreased frequency of said generally rectangular waveform.

10. A control system according to claim 9 with said duty cycle means comprising
a first transistor stage having its input connected to said supplying means for triggering in response to a transistion of said generally rectangular waveform of a given polarity to initiate the cycle and having a capacitance timing circuit connected at its output for controlling the duration of said duty cycle, and
a second transistor stage having its input connected with the output of said capacitance timing circuit and having a circuit coupling the output thereof with the input of said first transistor stage to tend to maintain said first transistor stage in its triggered condition for the duration of said duty cycle.

11. A control system according to claim 10 with means coupled with said capacitance timing circuit for varying the duration of said duty cycle in response to a control signal.

References Cited

UNITED STATES PATENTS 3,229,270   1/1966   Rosenblatt.

ORIS L. RADER, *Primary Examiner.*

T. LYNCH, *Assistant Examiner.*